(No Model.)
J. JETT.
VELOCIPEDE.
No. 433,173. Patented July 29, 1890.
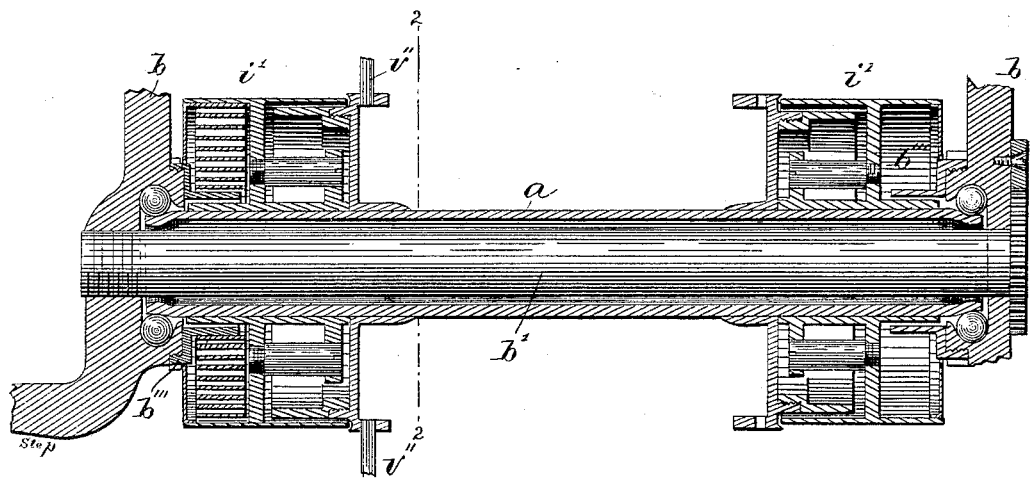
Witnesses
Frank Bucholtz
J E Kay
Inventor:
John Jett

UNITED STATES PATENT OFFICE.

JOHN JETT, OF GLEN BLAIR, CALIFORNIA.

VELOCIPEDE.

SPECIFICATION forming part of Letters Patent No. 433,173, dated July 29, 1890.

Application filed June 24, 1889. Serial No. 315,450. (No model.)

*To all whom it may concern:*

Be it known that I, JOHN JETT, a citizen of the United States, residing at Glen Blair, in the county of Mendocino and State of California, have invented a new and Improved Wheel, of which the following is a specification.

My invention relates to such wheels as are generally used in bicycles, and has special features relating to drive-wheels which are actuated by a treadle with a strap attached to a pulley which is connected to the hub by a clutch.

The object of my invention is to provide a wheel with anti-friction bearings, having special convenience for adjustment and adapted to be driven by a treadle with a strap attached to a pulley which is connected to the hub by a clutch. I accomplish this object by the mechanism illustrated in the accompanying drawing, in which the figure is a longitudinal section of the axle and adjoining parts.

Refering to the figure, the hollow rotating axle $a$ is made to support the anti-friction balls $a'$, which are situated in the circular recesses of the frame $b$ at each side of the wheel. The screw-bolt $b'$ has a milled head and a suitable latch and serves to adjust the bearing and hold the wheel to the frame. I am aware of screw-bolts being used heretofore to adjust bearings in which the balls bear against the hub of the wheel, but such a device is not applicable in this case on account of the pulley $i'$ and the spring-retaining collet $b'''$, as described and claimed in my application filed October 27, 1888, Serial No. 289,339, and shown by similar letters of reference in the figure of this application, and is intended to be used with this invention. In this case the collet $b'''$ must be attached to the frame and extend inward, and the pulley $i'$ must run loosely on the rotating axle between the hub and the frame, and the special arrangement and combination of parts just described is necessary for the proper adjustment of the wheel.

Having thus fully described my invention, what I claim, and desire to secure by Letters Patent, is—

1. The combination of a rotating axle $a$, adapted to support the anti-friction balls $a'$, which are situated in the circular recesses of the frame $b$ at each side of the wheel, and having the screw-bolt $b'$, adapted to adjust the bearing and hold the wheel to the frame, as shown and described.

2. The combination of a rotating axle $a$, adapted to support the independent rotating pulley $i'$ between the hub and the frame, and also adapted to support the anti-friction balls $a'$, which are situated in the circular recesses of the frame $b$ at each side of the wheel, and having the screw-bolt $b'$, adapted to adjust the bearing and hold the wheel to the frame, as described, and for the purpose stated.

JOHN JETT.

Witnesses:
   F. A. WHIPPLE,
   H. HOUSTON.